(12) United States Patent
Muni et al.

(10) Patent No.: US 9,077,990 B2
(45) Date of Patent: Jul. 7, 2015

(54) BLOCK NOISE DETECTION IN DIGITAL VIDEO

(75) Inventors: Byas Muni, Jharkhand (IN); Sujith Srinivasan, Karnataka (IN)

(73) Assignee: Marvell World Trade Ltd., St. Michael (BB)

( * ) Notice: Subject to any disclaimer, the term of this patent is extended or adjusted under 35 U.S.C. 154(b) by 575 days.

(21) Appl. No.: 13/023,769

(22) Filed: Feb. 9, 2011

(65) Prior Publication Data
US 2012/0027103 A1  Feb. 2, 2012

Related U.S. Application Data

(60) Provisional application No. 61/368,491, filed on Jul. 28, 2010.

(51) Int. Cl.
| H04N 7/30 | (2006.01) |
|---|---|
| H04N 19/14 | (2014.01) |
| H04N 19/172 | (2014.01) |
| H04N 19/182 | (2014.01) |
| H04N 19/44 | (2014.01) |
| H04N 19/86 | (2014.01) |

(52) U.S. Cl.
CPC ............. *H04N 19/14* (2014.11); *H04N 19/172* (2014.11); *H04N 19/182* (2014.11); *H04N 19/44* (2014.11); *H04N 19/86* (2014.11); *H04N 19/865* (2014.11)

(58) Field of Classification Search
CPC .................. H04N 19/00157; H04N 19/00909; H04N 19/00915; H04N 7/26127; H04N 7/26058
USPC ................ 375/240, 240.26, 240.29; 348/420; 382/164, 268
See application file for complete search history.

(56) References Cited

U.S. PATENT DOCUMENTS

| 6,188,799 | B1 | 2/2001 | Tan et al. |
|---|---|---|---|
| 6,360,024 | B1 | 3/2002 | Tan et al. |
| 6,738,528 | B1 * | 5/2004 | Nio et al. ...................... 382/268 |
| 6,810,082 | B1 * | 10/2004 | Shen et al. ................. 375/240.2 |
| 7,003,174 | B2 | 2/2006 | Kryukov et al. |
| 7,174,091 | B2 | 2/2007 | Umeda |
| 7,215,823 | B2 | 5/2007 | Miura et al. |
| 7,415,163 | B2 | 8/2008 | Nishi et al. |
| 7,426,313 | B2 | 9/2008 | Shohdohji |
| 8,331,717 | B2 | 12/2012 | Hou et al. |

(Continued)

FOREIGN PATENT DOCUMENTS

| EP | 0 998 146 | 5/2000 |
|---|---|---|
| EP | 0998 146 | 5/2000 |

(Continued)

OTHER PUBLICATIONS

International Search Report for PCT/IB2011/000413 dated May 10, 2011.

(Continued)

*Primary Examiner* — William C Vaughn, Jr.
*Assistant Examiner* — Naod Belai

(57) ABSTRACT

Systems and methods are provided for determining characteristics of video data. A frame of video data is obtained, where the frame is represented by pixel data. A value is assigned to an element of a detection array based on pixel data in a portion of the video frame corresponding to the element. A frequency transform of values of the detection array is determined, and a characteristic of the video data is extracted based on the output of the frequency transform.

20 Claims, 9 Drawing Sheets

(56) References Cited

U.S. PATENT DOCUMENTS

| | | |
|---|---|---|
| 2002/0080882 A1 | 6/2002 | Kitagawa |
| 2003/0021489 A1 | 1/2003 | Miura et al. |
| 2003/0053708 A1 | 3/2003 | Kryukov et al. |
| 2005/0117036 A1 | 6/2005 | Nishi et al. |
| 2006/0050783 A1 | 3/2006 | Le Dinh et al. |
| 2006/0104538 A1 | 5/2006 | Izumi |
| 2006/0171466 A1 | 8/2006 | Schoner et al. |
| 2006/0171467 A1 | 8/2006 | Schoner |
| 2006/0245499 A1 | 11/2006 | Chiu et al. |
| 2006/0245506 A1 | 11/2006 | Lin et al. |
| 2007/0076972 A1 | 4/2007 | Chiu |
| 2007/0160151 A1 | 7/2007 | Bolton et al. |
| 2007/0285729 A1 | 12/2007 | Wada |
| 2008/0152017 A1 | 6/2008 | Vendrig et al. |
| 2008/0175512 A1 | 7/2008 | Ohira |
| 2009/0290791 A1* | 11/2009 | Holub et al. ........... 382/164 |
| 2010/0060749 A1 | 3/2010 | Srinivasan |
| 2010/0061649 A1 | 3/2010 | Hou et al. |
| 2010/0128168 A1* | 5/2010 | Zhen et al. ........... 348/420.1 |

FOREIGN PATENT DOCUMENTS

| | | |
|---|---|---|
| EP | 1 111 928 | 6/2001 |
| EP | 1111 928 | 6/2001 |
| EP | 1549 075 | 6/2005 |
| EP | 1553778 | 7/2005 |
| EP | 1 928182 | 6/2008 |
| JP | 2007-336075 | 12/2007 |
| WO | WO 2007/072301 | 6/2007 |

OTHER PUBLICATIONS

Patent Cooperation Treaty (PCT) International Search Report and Written Opinion in co-pending PCT International Application No. PCT/IB2009/006932 having an International Filing Date of Sep. 9, 2009, with a mailing date of Feb. 5, 2010.

Gao W., et al: "Real-Time Video PostProcessing for Deblocking and Deringing on Media Processors" Internation Journal of Imaging Systems and Technology, Wiley and Sons, New York, vol. 13, Jan. 1, 2003 pp. 161-168, XP007901347.

Hyun Wook Park, et al: "A Postprocessing Method for Reducing Quantization Effects in Low Bit-Rate Moving Picture Coding" IEEE Transactions on Circuits and Systems for Video Technology, IEEE Service Center, Piscataway, NJ vol. 9, No. 1, Feb. 1, 1999, pp. 161-171, XP011014543.

* cited by examiner $$235 \quad T = \begin{bmatrix} 0 & x & 1 & 1 & 1 & x & 0 \\ 0 & x & 1 & 1 & 1 & x & 0 \\ 0 & x & 1 & 1 & 1 & x & 0 \\ 0 & x & 1 & 1 & 1 & x & 0 \\ 0 & \underbrace{x}_{240} & 1 & 1 & 1 & \underbrace{x}_{250} & 0 \end{bmatrix}$$

FIG. 2B

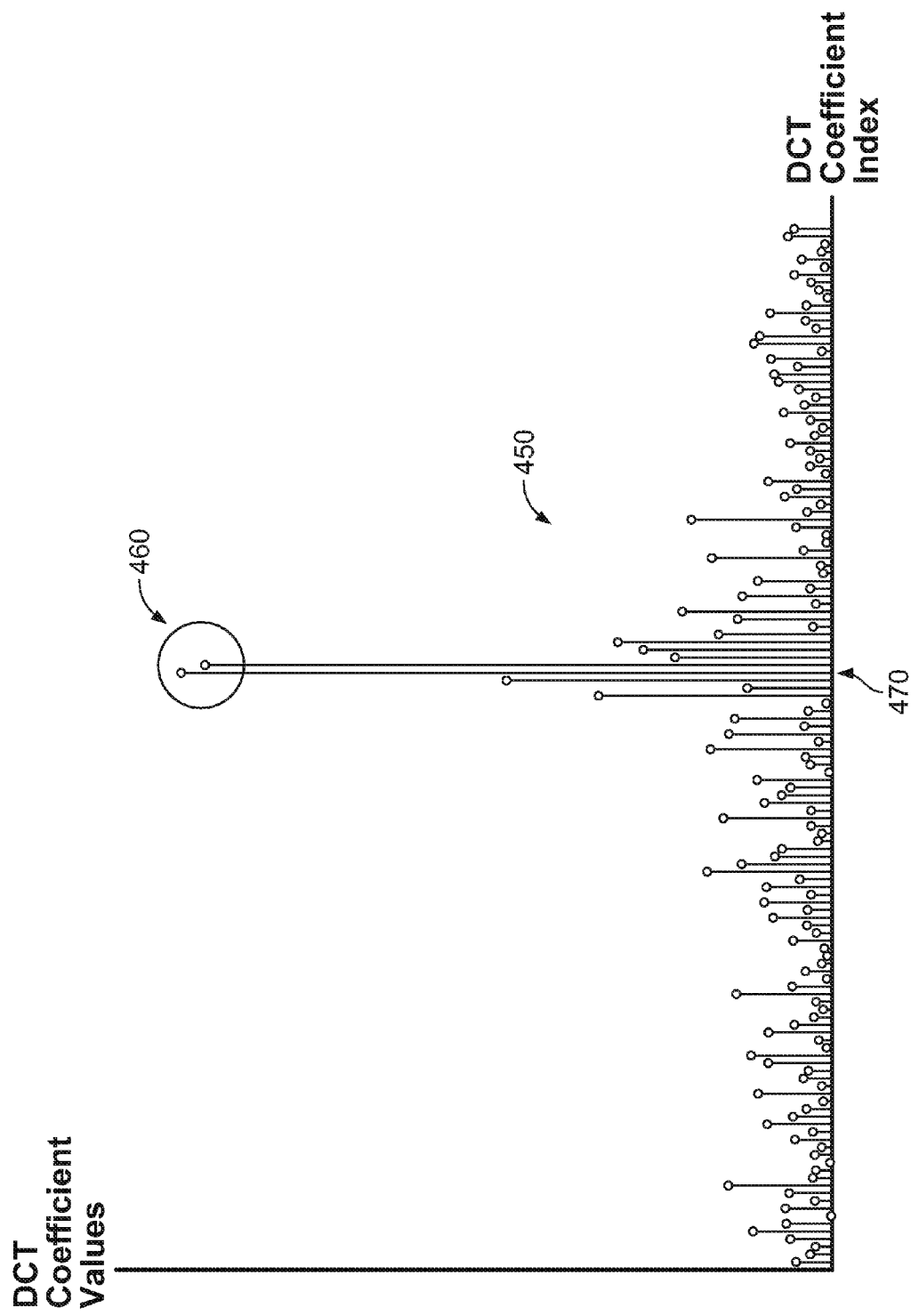

BLOCK NOISE DETECTION IN DIGITAL VIDEO

CROSS REFERENCE TO RELATED APPLICATION

This application claims the benefit under 35 U.S.C. §119(e) of U.S. Provisional Application No. 61/368,491, filed Jul. 28, 2010, which is hereby incorporated by reference herein in its entirety.

This application is related to U.S. patent application Ser. No. 12/555,960, which was filed on Sep. 9, 2009, entitled "REDUCING DIGITAL IMAGE NOISE."

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Digital video is often compressed prior to storage and/or transmission. Lossy compression techniques may be used to conserve storage space and/or transmission time associated with compressed video, but lossy compression may also introduce visual distortions known as compression artifacts. Block noise is a type of compression artifact generated when a compression scheme segments a video frame into distinct regions, or blocks, and compresses each block separately. Since each block is processed and compressed separately, the compressed blocks may exhibit discontinuities in pixel data values at their boundaries with other blocks. Further, these discontinuities may become readily visible at higher compression settings. This results in blocking artifacts, which may be particularly pronounced on high-resolution and/or large-size displays. Different compression algorithms use different block sizes. For example, the MPEG-2 standard uses 8×8 block sizes, while the H.264 standard may use more than one block size to compress a single video frame.

SUMMARY

In accordance with an embodiment of the invention, a technique is provided for determining a characteristic of video data. A frame of video data is obtained, where the frame includes R rows and C columns of pixel data. A value is assigned to a given element of a detection array based on pixel data in a column of the frame that is associated with the given element. A frequency transform of C values in the detection array is determined, and the characteristic of the video data is extracted from an output of the frequency transform.

In accordance with another embodiment of the invention, a video processing system is provided for determining a characteristic of video data. Acquisition circuitry is used to obtain a frame of the video data that includes R rows and C columns of pixel data. Boundary detection circuitry is used to assign a value to a given element of a detection array that includes C elements, based on pixel data in a column of the frame associated with the given element, and to store C elements of the detection array. Frequency transform circuitry is used to compute a frequency transform of C values in the detection array, and parameter extraction circuitry is used to extract the characteristic from an output of the frequency transform.

In an arrangement, the value assigned to the given element of the detection array is indicative of a number of pixels in the column of the frame that is associated with the given element that lie within a pixel distance from a block boundary. In an arrangement, the extraction of the characteristic includes determining a peak value of the output of the frequency transform, and comparing the peak value to an average value of the output of the frequency transform. In an arrangement, the characteristic is a block size of the video data.

Further features of present disclosure, including its nature and its various advantages, will be more apparent from the accompanying drawings and the following detailed description of preferred embodiments.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2B depicts a form of a template in accordance with some embodiments of the present disclosure;

FIG. 4B shows an illustrative set of DCT coefficients in accordance with some embodiments of the present disclosure.

DETAILED DESCRIPTION

To detect blocking artifacts, some video processing techniques assume that blocks are of a known, and possibly fixed size, and search for block boundaries using this assumed information. These techniques may fail to detect blocks that are not of a fixed and/or known block size, such as, for example, when the video data has been scaled. For example, when standard NTSC video is scaled to a high definition formation, an 8×8 block of image data is converted to a 21.33×18 block of image data. Traditional techniques may fail to determine blocks that are sized in a non-square pattern and/or with fractional block sizes.

Figure 1A:
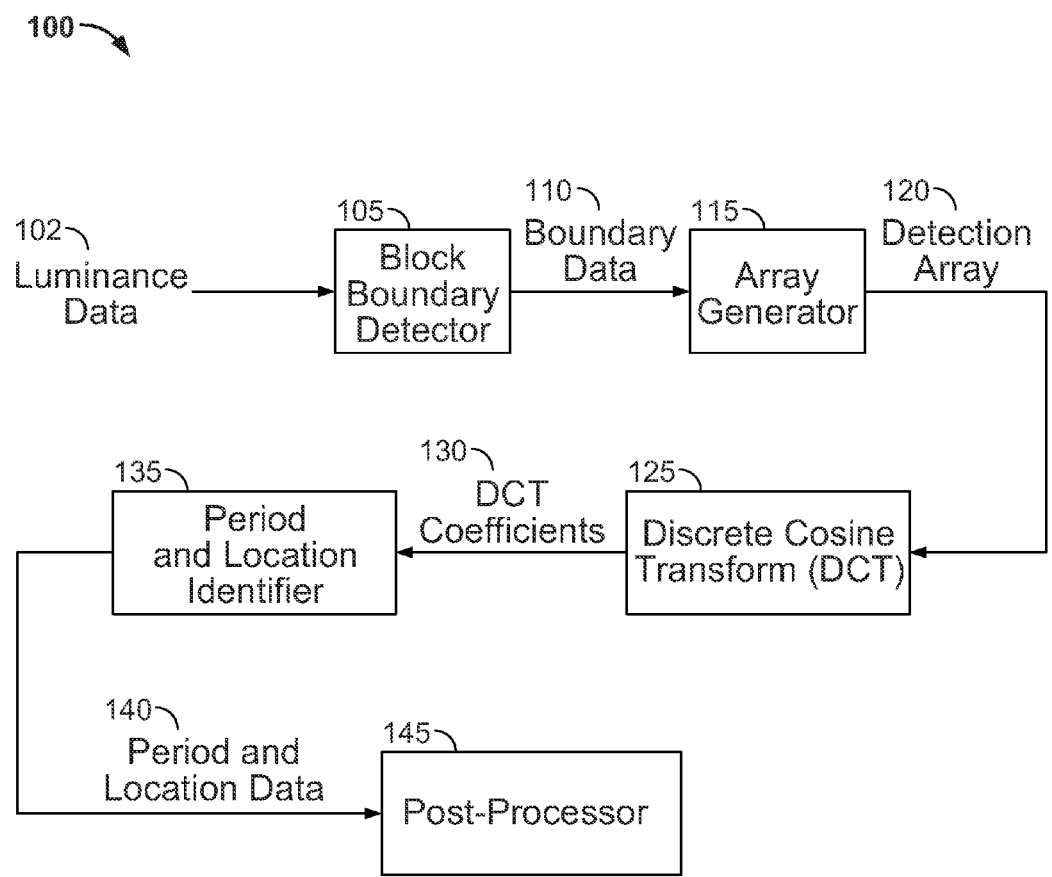
FIG. 1A shows an illustrative video processing system in accordance with some embodiments of the present disclosure.

FIG. 1A shows an illustrative video processing system in accordance with some embodiments of the present disclosure. Video processing system 100 determines characteristics introduced during compression of video data. For example, video processing system 100 may be used to detect block artifacts and other information related to the size and location of block artifacts.

Video data is obtained in a compressed form from a suitable video source, such as a traditional analog or digital television signal, video recording signal, Internet transmission, or a permanent or portable digital storage device signal. The obtained video data is then uncompressed to provide luminance data 102 to video processing system 100. Luminance data 102 is logically and/or physically portioned in frames of video data, where each frame corresponds to a single still image of video. In an arrangement, each frame of luminance data 102 represents an image from a high-definition television broadcast. For example, each frame may represent a total of 1280×720 or 1920×108 pixels of data.

Luminance data 102 is input to block boundary detector 105. Block boundary detector 105 is used to classify each pixel of luminance data 102 as either a block boundary pixel, if the pixel lies on or near a block boundary of a frame of video data, or a normal pixel, if the pixel does not lie on or near a block boundary of the frame. Block boundary detector outputs boundary data 110. Boundary data 110 contains the same number of elements as luminance data 102. In an arrangement, each element of boundary data 110 is a binary number. In this arrangement, a pixel of boundary data 110 is assigned a value '1,' if a corresponding pixel of luminance data 102 is on or near a boundary. The pixel of boundary data 110 is assigned a value '0' otherwise.

Luminance data 102 is represented by an R×C matrix of analog or digital values, where R refers to a number of rows in the representation, C refers to a number of columns in the representation, and where each value in the R×C matrix represents the brightness of a corresponding pixel in a video frame. In this arrangement, boundary data 110 may be represented by a R×C binary valued matrix, where an element of boundary data 110 is assigned a value '1,' if a corresponding pixel of luminance data 102 is on or near a boundary, and the element of boundary data 110 is assigned a value '0' otherwise.

Detecting block boundaries on a pixel-by-pixel basis, as described above, provides some indication of actual block boundaries in luminance data 102. However, this technique may not detect a block boundary in luminance data 102 when the difference in luminance values on either side of the boundary is small. Further, a boundary in luminance data 102 may be errantly detected when actual details in the video image resemble block artifacts within a local neighborhood. Therefore, boundary data 110 is input to array generator 115 which generates a column array or row array, or both. The output of array generator 115 provides an indication of whether a boundary exists on or near a respective row or column of a frame of data represented by luminance data 102.

Array generator 115 stores results in one or two one-dimensional arrays, referred to as detection arrays. In particular, array generator 115 may store vertical boundary information in a vertical detection array having a number of elements equal to the vertical length, in pixels, of the corresponding video frame represented by luminance data 102 (e.g., length R). Similarly, array generator 115 may store horizontal boundary information in a horizontal detection array having a number of elements equal to the horizontal length, in pixels, of the corresponding video frame represented by luminance data 102 (e.g., length C). Therefore, array generator employs a horizontal detection array, a vertical detection array, or both. Boundary information may be a binary measure, or any other suitable measure, of whether a boundary is likely to exist on or near a corresponding column or row of a frame of data represented by luminance data 102.

For simplicity of presentation, the reminder of this disclosure will describe array generator 115 as outputting a horizontal detection array only, i.e., detection array 120. However, it should be understood based on the disclosure and teachings provided herein that only a vertical detection array, or both a horizontal and vertical detection array, may be output by array generator 115. More generally, it should be understood based on the disclosure and teachings provided herein that the techniques presented in this disclosure are readily modifiable to incorporate only a vertical detection array, or both a horizontal and vertical detection array.

Discrete Cosine Transformation (DCT) module 125 receives detection array 120 as input and statistically analyzes detection array 120 to determine DCT coefficients 130. In order to conserve hardware resources, DCT module 125 may determine only those DCT coefficients that correspond to likely block sizes in luminance data 102. For example, detection array 120 may have a length of 1024 elements. In this case, DCT transform module may compute a full set of 1024 DCT coefficients. On the other hand, to save hardware resources, DCT may compute only those DCT coefficients that correspond to likely block sizes. In practice, DCT module 125 may compute 20, 50, 100, or any other suitable number of coefficients, and the number of coefficients calculated may be determined based on the hardware resources available and/or time constraints. DCT module 125 outputs DCT coefficients 130 to period and location identifier 135.

Period and location identifier 135 analyzes the values of DCT coefficients 130 to determine the presence and location of peaks in DCT coefficients 130, where the peaks are indicative of a periodicity of blocks in luminance data 102. Typically, DCT coefficients 130 will reflect a large mean (DC) component. However, this mean component may not be included in the computation performed by DCT module 125, or else may be ignored by period and location identifier 135.

The period and/or location of blocks determined by period and location identifier 135 may be input to post processor 145. Post processor 145 reduces the visibility of block noise in luminance data 102 and/or in subsequent frames of video data. For example, post processor 145 may apply spatial edge-adaptive filtering on luminance data 102 and/or on subsequent frames of video data based on period and location data 140 output from period and location identifier 135. The degree of filtering performed at post processor 145 may be adapted according to the magnitude of a peak coefficient indicated by period and location data 140. Further, post processor 145 may perform scaling and edge enhancement based on period and location data 140. For example, soft-scaling and low-edge enhancement may be performed at post processor 145.

To conserve hardware resources, video processing system 100 may process only some of the video frames present in a decompressed video stream. In an arrangement, only odd-numbered video frames are processed, and the processing occurs during the time it takes for two video frames to be received and decompressed. Alternatively, video processing system 100 may process video frames less frequently (e.g., one out of every five decompressed video frames) or more frequently (e.g., ninety-percent of all video frames). Processing only a fraction of received video frames advantageously permits the techniques shown in FIG. 1A to be completed over a longer time period than would otherwise be required (i.e., if every received video frame was processed by video processing system 100).

Figure 1B:
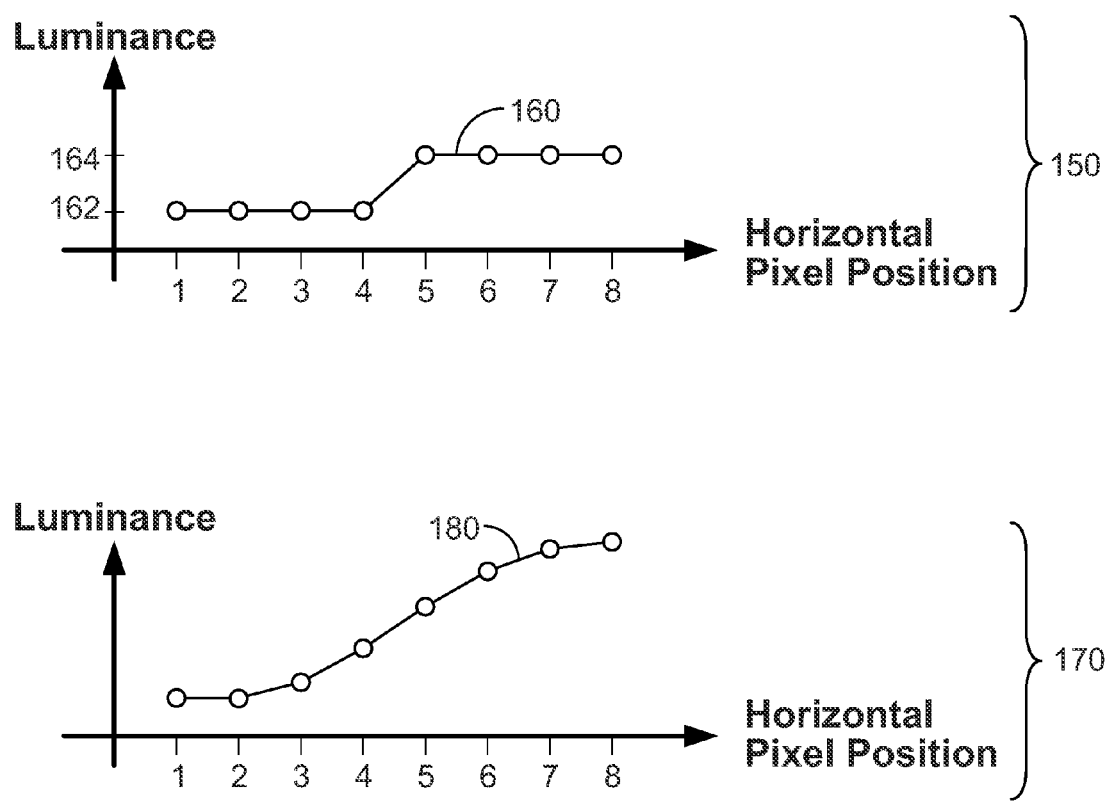
FIG. 1B shows two illustrative sets of luminance data in accordance with some embodiments of the present disclosure.

FIG. 1B shows two illustrative sets of luminance data in accordance with some embodiments of the present disclosure. Luminance values 160 and 180 may each represent eight consecutive samples of luminance data 102 (FIG. 1A) that are all located in a given horizontal row of a video frame.

Graph 150 plots luminance values 160 in units of brightness, or luminance, on the y-axis versus pixel position on the x-axis. Luminance values 160 represents a typical pattern of pixel brightness values near a block boundary when no smoothing, scaling, or similar image processing techniques have been performed on luminance data 102 (FIG. 1A). Samples 1-4 of luminance data 102 (FIG. 1A) belong to a first block of image data within a frame, whereas samples 5-8 belong to a second block. As shown in FIG. 1B, the output of luminance values 160 clusters around two distinct brightness levels. In particular, samples 1-4 of luminance values 160 are each of (approximately) one brightness level, level 162, whereas samples 5-8 are each of approximately a second brightness level, level 164.

Graph 170 plots luminance values 180 in units of brightness, or luminance, on the y-axis versus pixel position on the x-axis. Luminance values 180 represents a typical pattern of pixel brightness values near a block boundary after smoothing, scaling, and/or similar image processing techniques have been applied to luminance data 102 (FIG. 1A). Samples 1-4 of luminance data 102 (FIG. 1A) belong to a first block of image data within a frame, whereas samples 5-8 belong to a second block. The output of luminance values 180 exhibits a gradually increasing pattern of brightness. This gradual increase in output values (as opposed to a sharp transition, as exhibited in graph 150) is due to smoothing, scaling, and/or other image processing that has been performed on luminance data 102 (FIG. 1A).

Figure 2A:
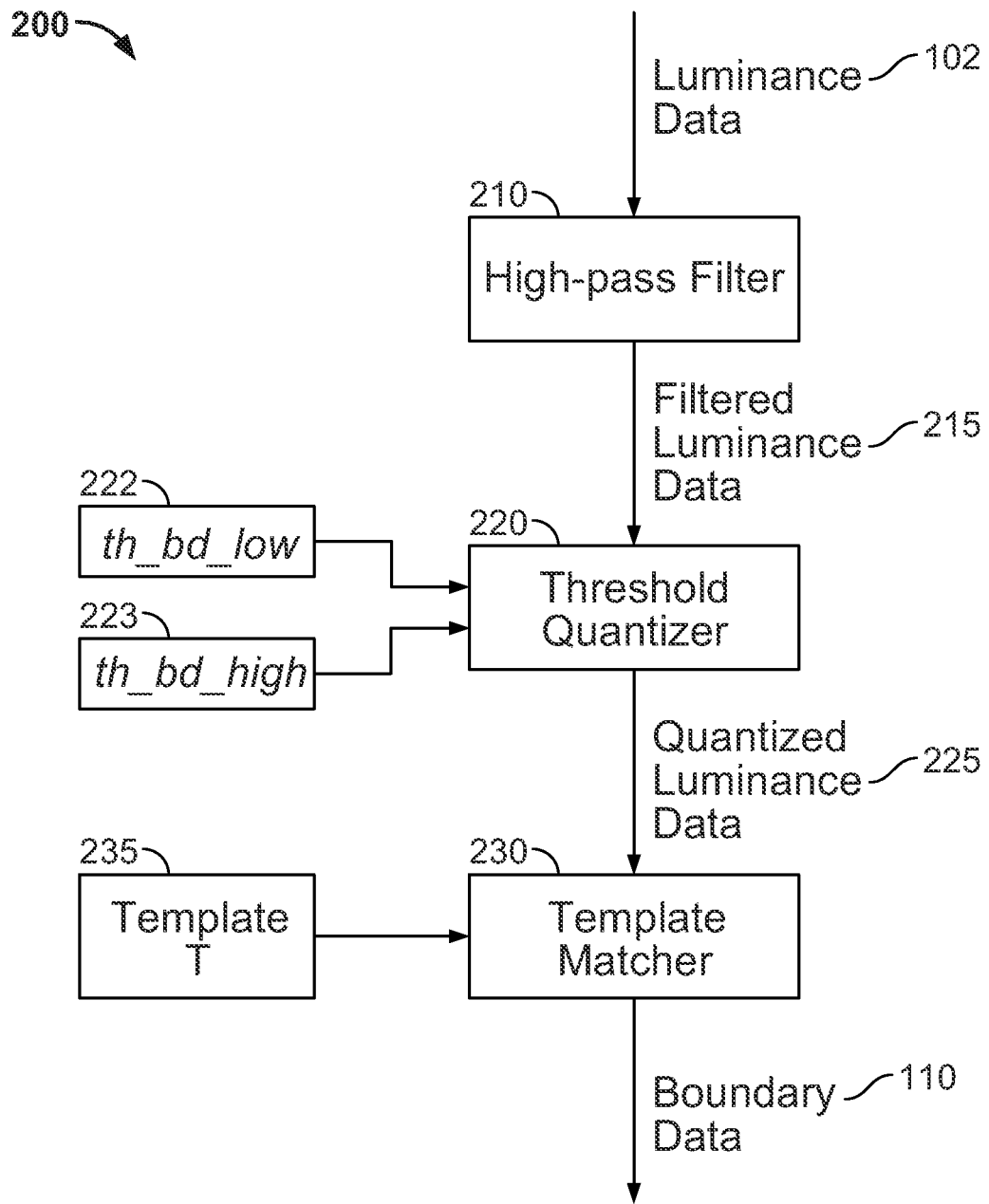
FIG. 2A is an illustrative flowchart for detecting block boundaries in video data in accordance with some embodiments of the present disclosure.

FIG. 2A is an illustrative flowchart for detecting block boundaries in video data in accordance with some embodiments of the present disclosure. In an arrangement, process 200 is implemented in block boundary detector 105 (FIG. 1A). Process 200 may be implemented in video processing software, where the software is executed by one or more microprocessors, or directly in specialized video processing hardware.

At 210, luminance data 102 (FIG. 1A) is high-pass filtered using any suitable software or hardware-based filter. High-pass filtering accentuates pixel magnitude differences between pixels within a row of a video frame. In an arrangement, high-pass filter [1 0 0 −1] is implemented at 210. This high-pass filter compares the magnitude of a current pixel and a pixel located three elements to the horizontal right of the current pixel. Other high-pass filters may be used at 210. For example, a high-pass filter with more or fewer zero elements may be used, e.g., the high-pass filters [1 0 −1] and [1 0 0 0 0 −1] may be used. The output of the high-pass filter at 210, referred to as filtered luminance data 215, is then passed to a threshold quantizer at 220.

At 220, filtered luminance data 215 is filtered by a threshold quantizer. In particular, each element of filtered luminance data 215 is compared to a lower threshold, th_bd_low 222, and an upper threshold, th_bd_high 223. An element of filtered luminance data 215 that is between these two thresholds is assigned the value '1' in a corresponding output element of quantized luminance data 225. On the other hand, an element of filtered luminance data 215 that is not between these two thresholds is assigned the value '0' in the corresponding output element of quantized luminance data 225.

Threshold th_bd_low 222 is used to eliminate false boundary detections caused primarily by image noise, while threshold th_bd_high 223 is used to eliminate false boundary detections caused primarily by naturally occurring image features that happen to be "block-like." In particular, threshold th_bd_low 222 is set to a value that adequately distinguishes between changes in pixel values that are normal within an image (i.e., "smooth") versus those that indicate a block boundary transition. On the other hand, threshold th_bd_high 223 is set to a value that adequately distinguishes been block boundaries and even "sharper" transitions in a video frame that are due to natural features of the video frame. The output of the threshold quantizer at 220 is referred to as quantized luminance data 225. Quantized luminance data 225 is further filtered by template matcher 230 using template T 235. Template matcher 230 compares a "neighborhood" of data from quantized luminance data 225 to template 235 in to determine if there is a "template match."

FIG. 2B depicts a form of template T 235 in accordance with some embodiments of the present disclosure. As shown in FIG. 2B, template T 235 is a 5×7 matrix. In this arrangement, template matcher 230 (FIG. 2A) compares a corresponding 5×7 neighborhood of data, centered about a particular element of quantized luminance data 225 (FIG. 2A), to template T 235. That is, template matcher 230 (FIG. 2A) compares 5 rows and 7 columns of luminance data 225 (FIG. 2A), equaling 35 total values of data, to template T 235. If template matcher 230 (FIG. 2A) depicts a match, it outputs '1,' and if detects one or more differences between the 5×7 neighborhood of quantized luminance data 225 (FIG. 2A) and template T 235, then it outputs a '0.' This process is repeated for each element of quantized luminance data 225 (FIG. 2A) resulting in the output of boundary data 110 (FIG. 1A). Boundary data 110 (FIG. 1A) is therefore the same size as quantized luminance data 225 (FIG. 2A) and the same size as luminance data 105 (FIG. 1A). In FIG. 2B, each of the 'x' values in columns 240 and 250 represent "don't care" conditions. That is, template matcher 230 (FIG. 2A) will detect a match between an element of template T 235 having an 'x' value and a corresponding element of luminance data 235, whether the corresponding element of luminance data 235 is '0' or '1.'

The design of template T 235 depicted in FIG. 2B is merely one suitable design, and many other designs would also be suitable for implementation in template matcher 230 (FIG. 2A). For example, template matcher 230 (FIG. 2A) could use a template of a size other than 5×7 pixels, could incorporate more or fewer "don't care" conditions, and/or could exhibit an irregular shape with regard to placement of the '0,' '1,' and 'x' elements. Further, template matcher 230 (FIG. 2A) could vary the size of the template based on the corresponding element of quantized luminance data 225 (FIG. 2A) that it is being compared against. For example, template matcher 230 (FIG. 2A) may use a truncated or otherwise reduced size template when it is comparing the template against elements of quantized luminance data 225 (FIG. 2A) that represent pixels on or near the edges of a video frame.

Figure 3A:
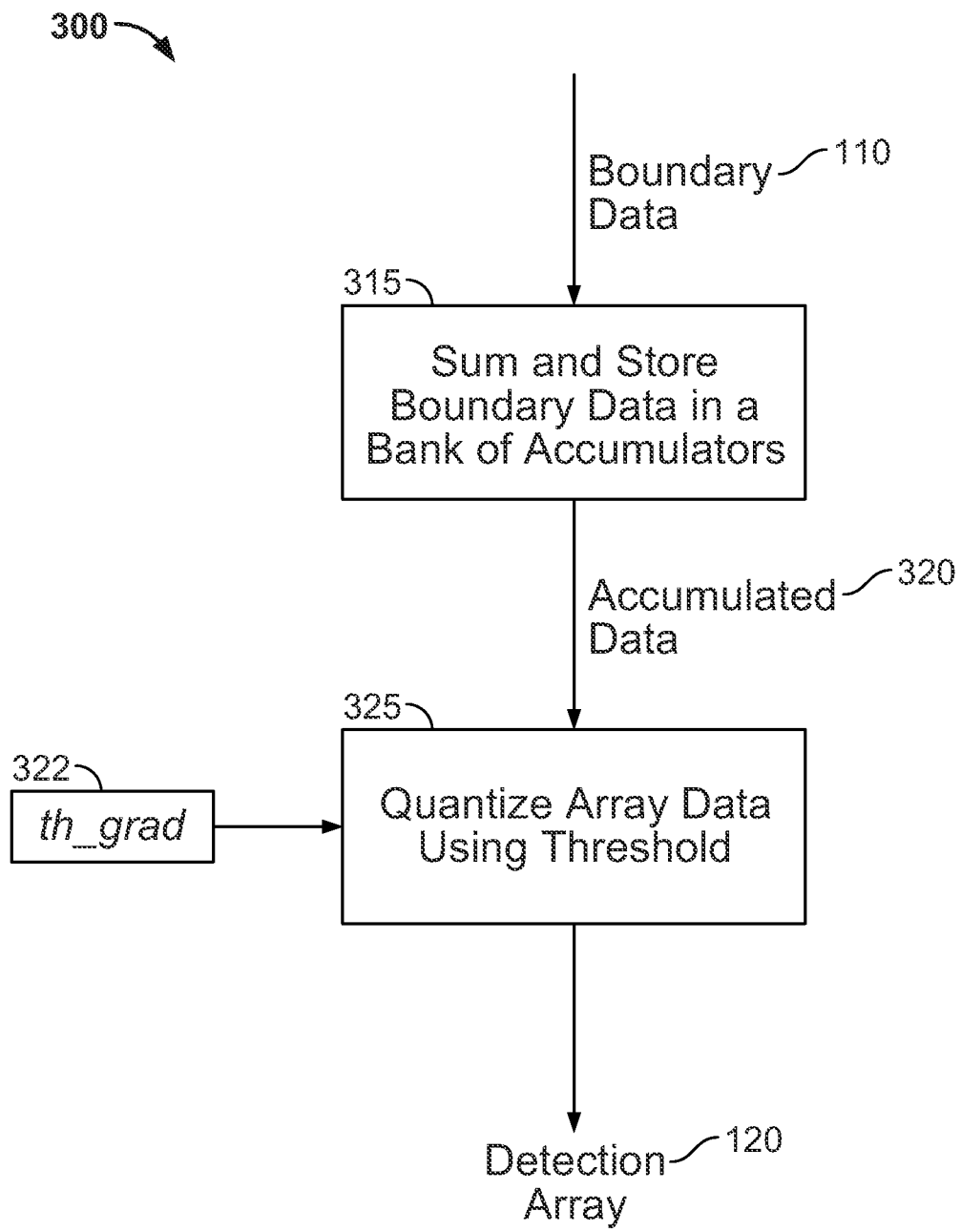
FIG. 3A is an illustrative flowchart for generating a detection array from boundary data in accordance with some embodiments of the present disclosure.

FIG. 3A is an illustrative flowchart for generating a detection array from boundary data in accordance with some embodiments of the present disclosure. Process 300 is used by array generator 115 (FIG. 1A) to generate, detection array 120 from boundary data 110. At 315, array generator 115 (FIG. 1A) sums the elements along each column of boundary data 110 (i.e., when boundary data 110 is represented in a matrix format mimicking the dimensions of a video frame) and the summed data is stored in a bank (e.g., a row) of accumulators as accumulated data 320. The magnitude of the data elements stored in the row of accumulators will provide an indication of how likely it is that there is block boundary in each column of boundary data 110. For example, if the block size of image data is 10×10, then accumulated data 320 would typically exhibit a peak value once every 10 samples, with smaller amplitude values at other points.

At 325, accumulated data 320 is quantized to either a '0' or '1' value using a threshold th_grad 322. In particular, each value of accumulated data 320 that is larger than th_grad 322 is quantized to the value '1,' whereas each value of accumulated data 320 that is smaller or equal to th_grad 322 is quantized to the value '0.' The output of 325, is (binary-valued) detection array 120. If a video frame corresponding to detection array 120 has block noise present, detection array 120 will characteristically exhibit the value '1' at regular intervals and the value '0' elsewhere.

Figure 3B:
FIG. 3B shows an illustrative example of a detection array in accordance with some embodiments of the present disclosure.

For example, FIG. 3B shows an illustrative example of a detection array in accordance with some embodiments of the present disclosure. In particular, FIG. 3B shows an illustrative example of detection array 120 versus the index of detection array 120 when a block size associated with luminance data is 12×12 (only a portion of detection array 120 is shown for clarity). In FIG. 3B, it is seen that peaks, exemplified by at least one consecutive '1' value, occur once every 12 index values. On the other hand, if the video frame corresponding to detection array 120 does not have block noise present, then a similar plot would not show such a regular and periodic pattern.

Due to false or missed block boundary detections, detection array 120 may not contain perfectly periodic data. However, the underlying periodicity of the data of detection array 120 may be extracted using frequency transformation techniques. For example, the DCT may be used to perform a frequency transformation of detection array 120 while also avoiding the extra computational requirements (e.g., involving complex numbers) of other frequency transformation techniques.

Figure 4A:
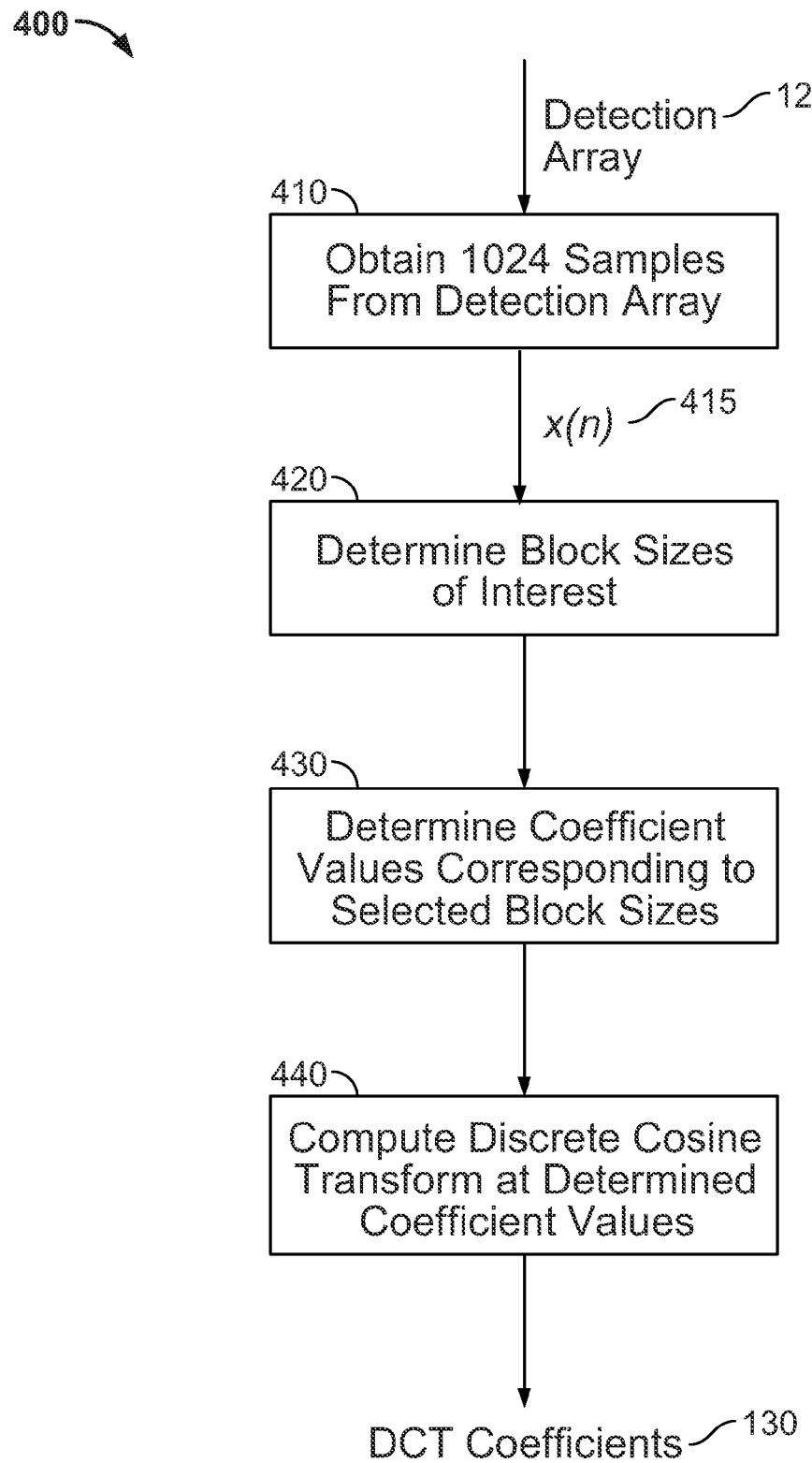
FIG. 4A is an illustrative flowchart for generating a set of DCT coefficients from a detection array in accordance with some embodiments of the present disclosure.

FIG. 4A is an illustrative flowchart for generating a set of DCT coefficients from a detection array in accordance with some embodiments of the present disclosure. Process 400 is implemented by DCT module 125 (FIG. 1A). At 410, DCT module 125 (FIG. 1A) obtains 1024 samples from detection array 120 which will be used to determine the presence of any block boundaries in luminance data 102 (FIG. 1A). In particular, if detection array 120 contains more than 1024 samples, DCT module will obtain exactly 1024 samples of detection array 120 by truncating detection array 120 at 410. Typically, DCT module will perform this truncation by retaining the center 1024 samples from detection array 120. However, DCT module may perform any suitable form of truncation, including truncation based on sampling algorithms or by extracting a contiguous set of samples from the "left" or "right" portions of detection array 120. On the other hand, if detection array 120 contains fewer than 1024 samples, DCT module 125 (FIG. 1A) will add zero-padding samples to detection array 120 in order to make the total number of samples 1024. The signal output at after processing at 410 is referred to as digital signal x(n) 415.

It should be understood based on the disclosure and teachings provided herein that a number of samples other than 1024 samples may be used in process 400. For example, any suitable integer value of samples may be used. In may be advantageous to use a number of samples that is a power of 2 (i.e., 256, 512, 1024, 2056, etc.), including any zero-padding bytes added at 410, in order to provide an efficient computational implementation of process 400.

At 420, DCT module 125 (FIG. 1A) may determine a set of candidate block sizes, smaller than the set of 1024 possible block sizes, in order to efficiently identify the presence of block compression artifacts in luminance data 102 (FIG. 1A). By selecting to analyze only some block sizes, rather than all 1024 possibilities, the computation complexity of DCT module 125 (FIG. 1A) may be significantly reduced. For example, in a particular application, it may be the case that only candidate block sizes of 8 to 22 need to be considered by video processing system 100 (FIG. 1A) in order to detect the presence of possible block artifacts (this may be due to a priori knowledge of a video compression protocol, for example). In this case, DCT module 125 (FIG. 1A) sets or obtains the block size parameter range 8 to 22 at 420. In practice, block size typically ranges from 4 to 25 and therefore only DCT coefficients that correspond to this range of block sizes need to be calculated, as described next.

At 430, the DCT indices corresponding to the block sizes selected at 420 are determined. In particular, coefficient indices are related to selected block sizes by the relationship $$n = \frac{2N}{S},$$

where n is a DCT coefficient index value, S is a selected block size, and N is the number of samples contained in digital signal x(n) 415. Typically, N=1024, as described above, and, in this case, the relationship becomes $$n = \frac{2048}{S}.$$

Thus, if only block sizes of 8 to 21.33 are anticipated in luminance data 102 (FIG. 1A), then only coefficients with indices from 96 to 256 need to be calculated. Therefore, in this case, rather than computing a total of 1024 DCT coefficients, only 161 coefficients need to be calculated. This allows DCT module 125 (FIG. 1A) to run optimally, or close to optimally, while requiring the computation of only 15-percent of the overall number of possible DCT coefficients.

At 440, process 400 computes the DCT of the digital signal x(n) 415 evaluated at the coefficient index values determined at 430. DCT coefficients 130 will also be denoted X(k), to indicate a particular coefficient, and {X(k)}, to indicate a set of coefficients. In particular, DCT module 125 (FIG. 1A) converts digital signal x(n) 415 into DCT coefficients 130 using the relationship $$X(k) = \sum_{n=0}^{N-1} x(n) \cos\left[\frac{\pi}{N}\left(n + \frac{1}{2}\right)k\right]$$

where k=0, ..., N−1 is the coefficient index and where, as described above, N is the number of samples contained in digital signal x(n) 415. As shown by this relationship, each coefficient is calculated by summing N input values from digital signal x(n) 415, where each input value is multiplied by a cosine term. If digital signal x(n) 415 is periodic, then certain coefficients of {X(k)} will take on large values. The indices of these coefficients indicate periodicities of digital signal x(n) 415, and hence, the size of compression blocks in luminance data 102 (FIG. 1A). On the other hand, if block noise is not present, then none of coefficients {X(k)} will be of a particularly high value relative to the average value of all the coefficients {X(k)}.

The cosine values used by DCT module 125 (FIG. 1A) may be may be stored using a lookup table or memory. Further, DCT module 125 (FIG. 1A) needs only to store cosine values for angles in the range 0-90, since cosine values for all other angles, i.e., in the range 90-360 degrees, may be derived from those angles in the range 0-90. The output of process 400 is DCT coefficients 130. The number of coefficients in DCT coefficients 130 is equal to the number of block sizes of interest determined at 420.

FIG. 4B shows an illustrative set of DCT coefficient values in accordance with some embodiments of the present disclosure. DCT coefficient values are plotted on the y-axis, while the DCT coefficient index is plotted on the x-axis. DCT coefficient values 450 represent a portion of a typical set of DCT coefficients computed at 440 (FIG. 4A). In an arrangement, DCT coefficient values 450 represent a portion of DCT coefficients 130.

In FIG. 4B, there is a distinct peak around the coefficient index values that correspond to amplitude region 460. This peak indicates that the luminance data 102 (FIG. 1A) has a pronounced block artifact effect, and further, that compression blocks present in luminance data 102 (FIG. 1A) have a periodicity approximately or exactly equal to the block size corresponding to DCT coefficient index 470. Although not apparent from FIG. 4B, DCT coefficients 130 (FIG. 1A) may, in general, exhibit multiple, regularly-spaced peaks when plotted versus the DCT coefficient index. This may be due to the presence of harmonics. For example, a compression block size of 8×8 means that DCT coefficients 130 (FIG. 1A) is periodic with a period 8 as well as a period of 16, a period of 24, etc. This is important when the exact compression block size needs to be found at period and location identifier 135 (FIG. 1A).

Figure 5:
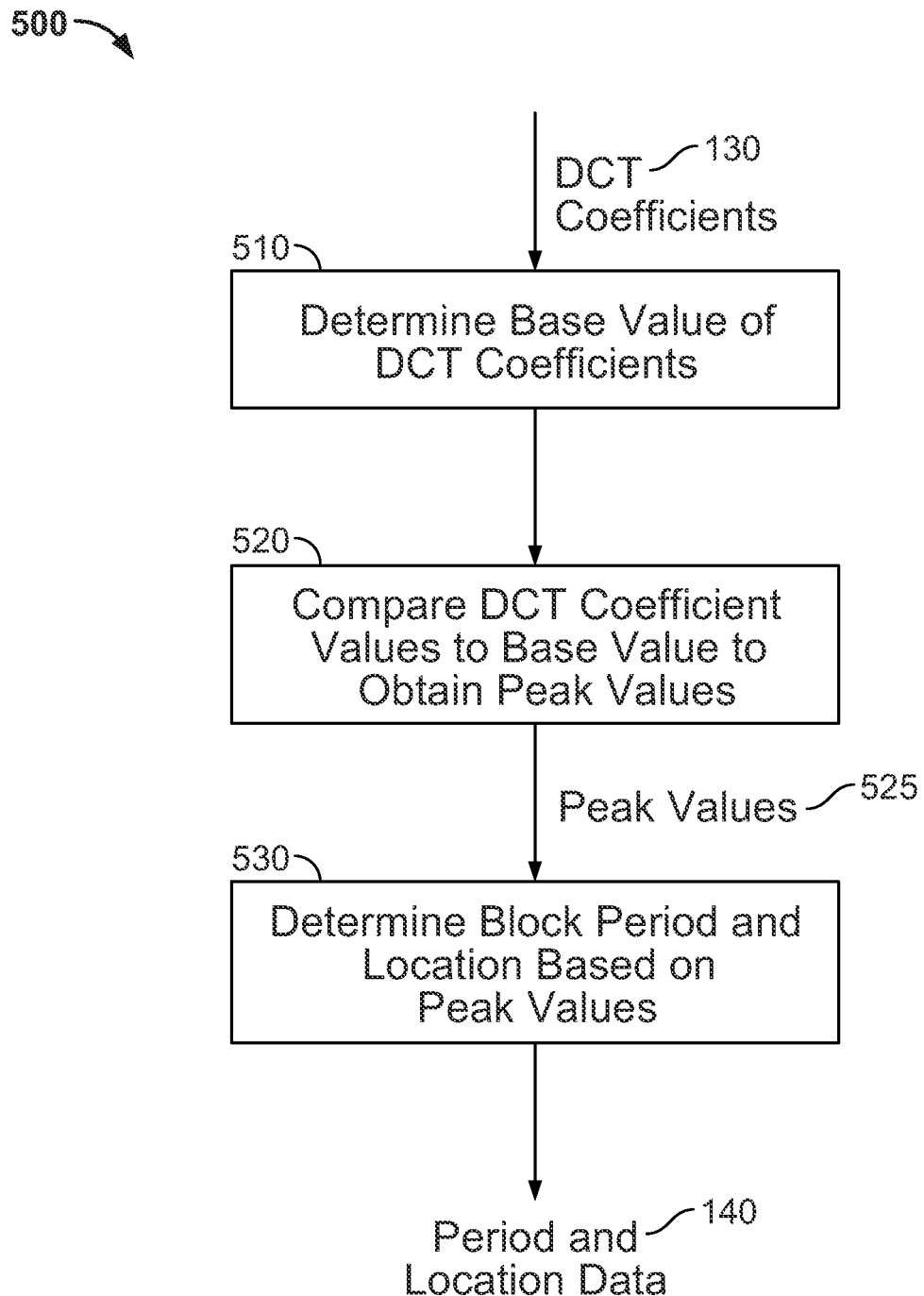
FIG. 5 is an illustrative flowchart for extracting information about a period and location of blocks, and block artifacts, contained in luminance data in accordance with some embodiments of the present disclosure.

FIG. 5 is an illustrative flowchart for extracting information about the period and location of blocks, and block artifacts, contained in luminance data 102 (FIG. 1A) in accordance with some embodiments of the present disclosure. In particular, FIG. 5 illustrates a flowchart for extracting information about the period and location of blocks, and block artifacts, contained in luminance data 102 (FIG. 1A) from DCT coefficients 130. Process 500 is implemented by period and location identifier 135 (FIG. 1A).

At 510, period and location identifier 135 (FIG. 1A) calculates or otherwise determines a base value of DCT coefficients 130. A base value may be calculated using any suitable technique. For example, a base value may be determined as the average of all the coefficients of DCT coefficients 130. Further, period and location identifier 135 (FIG. 1A) may discard outlier coefficient values from DCT coefficients 130 before determining a base value.

At 520, period and location identifier 135 (FIG. 1A) may determine peak values of DCT coefficients 130 by comparing certain candidate peak values in DCT coefficients 130 to the base value determined at 510. For example, a maximum coefficient value from DCT coefficients 130 may be selected as a candidate peak value and compared to the base value. This maximum coefficient value may be determined to be a peak only if its value is adequately larger than the base value. A determination of whether a candidate peak is an actual peak may be made by comparing the ratio of the candidate peak's value and the base value determined at 510 to a threshold value and/or by requiring the magnitude of the difference between the candidate peak's value and the base value to exceed a threshold value. Additionally, multiple candidate peak values may be selected from DCT coefficients 130. For example, the 2, 5, 10, or 20 largest values from DCT coefficients 130 may be selected as candidate peak values. Each of these candidate peak values may then be tested to determine whether they are (actual) peak values using, for example, any of the criteria described above. The output 520 is a set of peak values 525.

At 530, period and location identifier 135 (FIG. 1A) determines a block period and/or location within a frame of video data, i.e., luminance data 102 (FIG. 1A), based on peak values 525. If exactly one peak is included in peak values 525, then period and location identifier 135 (FIG. 1A) determines the block period from the DCT coefficient index corresponding to the peak, and may also determine a block location (i.e., offset within a frame). This information is output as period and location data 140.

On the other hand, more than one peak value may be included in peak values 525. For example, DCT coefficients 130 may contain multiple peaks due to harmonics. In this case, period and identification module 135 (FIG. 1A), will determine the "proper" peak by finding the greatest common divisor among the periods associated with each of the peaks in peak values 525. For example, if peak values 525 includes four peaks, corresponding to periods of one block per 8 pixels, one block per 16 pixels, one block per 24 pixels, and one block per 32 pixels, then period and location identifier 135 (FIG. 1A) will determine the periodicity of compression blocks in luminance data 102 (FIG. 1A) to be 8, since 8 is the greatest common division of 8, 16, 24, and 32.

Further, due to the nature of the DCT performed at DCT module 125 (FIG. 1A), candidate peaks may not appear with periodicities that are exact multiples of each other. For example, due to numerical imprecision and potentially imperfect extraction of information at all steps of video processing system 100 (FIG. 1A), peak values 525 may contain peaks associated with periodicities of one block per 8 pixels, one block per 17 pixels, one block per 23 pixels, and one block per 33 pixels. In this case, period and location identifier 135 (FIG. 1A) would run a greatest common denominator algorithm with a further robustness criterion. The algorithm would be able to determine that, subject to the robustness criterion, the periodicity of blocks in luminance data 102 (FIG. 1A) is one block every 8 pixels.

The foregoing describes, inter alia, methods and apparatus for detecting block noise in digital video data. The disclosed techniques enable a detection of the presence of compression block artifacts, in a horizontal and/or vertical direction, irrespective of a block size of video data. The disclosed techniques may be implemented independently from any information from a decoder. The disclosed techniques may be implemented using a reduced hardware set, and in some embodiments, do not require any frame storage. Detecting the presence of block compression artifacts may be used to trigger noise removal filtering to reduce block artifacts and to program other post-processing techniques for noisy content.

The above described embodiments of the present disclosure are presented for the purposes of illustration and not of limitation. For example, the described technique of FIG. 1A may be performed over any number of video frames, and the described technique may be performed with or without video frame storage. Further, one or more parts of techniques described above may be performed in a different order (or concurrently) and still achieve desirable results. In addition, the disclosure may be implemented in hardware, such as on an application specific integrated circuit (ASIC) or on a field-programmable gate array (FPGA). The disclosure may also be implemented in software.

What is claimed is:

1. A method of determining a block size, the method comprising:
    obtaining luminance data from a frame of the video data, wherein the frame of the video data comprises R rows and C columns;
    detecting boundary data based on comparing a first element of the luminance data to a low threshold and a high threshold, wherein:

the low threshold is used to remove false boundary detections caused at least in part by noise in the frame of the video data, and the high threshold is used to remove false boundary detections caused at least in part by object features in the frame of the video data;

computing a second element of a detection array, the detection array comprising C elements, based on a column of the detected boundary data, wherein the column is associated with the second element;

selecting a subset of candidate block sizes from a set of possible block sizes;

computing a frequency transform of the C elements in the detection array at transform coefficients corresponding to the selected subset of candidate block sizes; and extracting the block size from an output of the frequency transform.

2. The method of claim 1, wherein the selected subset of block sizes is associated with a predetermined video compression protocol.

3. The method of claim 1, wherein the computed second element of the detection array indicates a number of elements in the column of the detected boundary data, wherein the elements in the column of the detected boundary data lie within a distance from a block boundary.

4. The method of claim 1, wherein the frequency transform is a Discrete Cosine Transform.

5. The method of claim 1, further comprising applying an image processing filter to the video data, wherein a parameter of the image processing filter is based, at least in part, on the extracted block size.

6. The method of claim 1, wherein extracting the block size comprises:

determining a peak value of the output of the frequency transform; and comparing the peak value to an average value of the output of the frequency transform.

7. The method of claim 1, wherein computing the second element of the detection array comprises summing the elements in the column of the detected boundary data and using a resulting sum of the summed elements as the computed second element.

8. The method of claim 7, further comprising:

associating a first logic value with the second element when the resulting sum exceeds a threshold; and associating a second logic value with the second element when the resulting sum does not exceed the threshold.

9. The method of claim 7, wherein a high-pass filter is applied to the luminance data prior to the summing.

10. The method of claim 7, wherein a template matcher is applied to the luminance data prior to the summing.

11. A video processing system for determining a block size, the video processing system comprising:

acquisition circuitry configured to obtain luminance data from a frame of the video data, wherein the frame of the video data comprises R rows and C columns;

boundary detection circuitry configured to:

detect boundary data based on comparing an element of the luminance data to a low threshold and a high threshold, wherein:

the low threshold is used to remove false boundary detections caused at least in part by noise in the frame of the video data, and the high threshold is used to remove false boundary detections caused at least in part by object features in the frame of the video data;

compute a second element of a detection array, the detection array comprising C elements, based on a column of the detected boundary data, wherein the column is associated with the computed second element; and store C elements of the detection array;

frequency transform circuitry configured to:

select a subset of candidate block sizes from a set of possible block sizes; and compute a frequency transform of the C elements in the detection array at transform coefficients corresponding to the selected subset of candidate block sizes; and parameter extraction circuitry configured to extract the block size from an output of the frequency transform.

12. The system of claim 11, wherein the selected subset of block sizes is associated with a predetermined video compression protocol.

13. The system of claim 11, wherein the computed second element of the detection array indicates a number of elements in the column of the detected boundary data, wherein the elements in the column of the detected boundary data lie within a distance from a block boundary.

14. The system of claim 11, wherein the frequency transform is a Discrete Cosine Transform.

15. The system of claim 11, further comprising image processing circuitry configured to filter the video data based, at least in part, on the extracted block size.

16. The system of claim 11, wherein the parameter extraction circuitry is further configured to extract the block size by:

determining a peak value of the output of the frequency transform; and comparing the peak value to an average value of the output of the frequency transform.

17. The system of claim 11, wherein the boundary detection circuitry is further configured to compute the second element of the detection array based on summing the elements in the column of the detected boundary data associated with the second element.

18. The system of claim 17, wherein the boundary detection circuitry is further configured to:

store a first logic value corresponding to the second element when a resulting sum of the summed elements exceeds a threshold; and store a second logic value corresponding to the second element when the resulting sum of the summed elements does not exceed the threshold.

19. The system of claim 17, wherein the boundary detection circuitry is further configured to apply a high-pass filter to the luminance data prior to the summing.

20. The system of claim 17, wherein the boundary detection circuitry is further configured to apply a template matcher to the luminance data prior to the summing.

* * * * *